United States Patent [19]

Kugler et al.

[11] Patent Number: 4,582,295
[45] Date of Patent: Apr. 15, 1986

[54] FLOW CHECK PREVENTION MECHANISM

[75] Inventors: Uwe H. Kugler; James A. Miller, both of Cedar Falls, Iowa

[73] Assignee: Deere & Company, Moline, Ill.

[21] Appl. No.: 755,410

[22] Filed: Jul. 15, 1985

Related U.S. Application Data

[63] Continuation-in-part of Ser. No. 491,519, May 4, 1983, abandoned, and a continuation-in-part of Ser. No. 696,542, Jan. 30, 1985, abandoned, which is a continuation of Ser. No. 438,120, Nov. 1, 1982, abandoned.

[51] Int. Cl.4 .............................................. F16L 29/00
[52] U.S. Cl. .............................. 251/149.6; 137/614.04; 137/614.06; 137/493.6; 137/493.9; 137/512.4; 251/149.9
[58] Field of Search ....................... 137/614.02, 614.03, 137/614.04, 614.05, 614.06, 614, 493.6, 493, 493.9, 512.4, 537, 614.2; 251/149.6, 149.9

[56] References Cited

U.S. PATENT DOCUMENTS

| | | | |
|---|---|---|---|
| 2,501,139 | 3/1950 | Patrick | 137/493.6 |
| 2,685,297 | 8/1954 | Charman | 137/493 X |
| 2,955,613 | 10/1960 | Block | 137/493.9 |
| 3,251,376 | 5/1966 | Worden | 137/493 X |
| 3,447,564 | 6/1969 | North et al. | 137/843 X |
| 3,730,221 | 5/1973 | Vih | 137/614 |
| 4,033,375 | 7/1977 | Hirsch | 137/493.9 |
| 4,303,098 | 12/1981 | Shindelar | 137/614.06 |
| 4,372,343 | 2/1983 | Trinkwalder, Jr. | 137/493 X |
| 4,373,551 | 2/1983 | Shindelar | 137/614.04 X |

FOREIGN PATENT DOCUMENTS

| | | | |
|---|---|---|---|
| 58686 | 3/1954 | France | 137/539 |
| 641722 | 8/1950 | United Kingdom | 137/493 |

Primary Examiner—A. Michael Chambers
Assistant Examiner—John C. Fox

[57] ABSTRACT

This invention relates to a flow check prevention mechanism especially useful in a female coupler for preventing closure of a male coupler coupled thereto should a vacuum occur in the female coupler when fluid flow out of the female coupler is momentarily blocked. The female coupler includes a housing having a bore formed therein with a receptacle movably positioned within the bore. The receptacle contains a main cavity which is connected by a passageway to an engagement bore. The engagement bore receives the male coupler. Located within the receptacle is a main poppet valve which controls the fluid flow through the passageway and a secondary poppet valve which relieves fluid pressure from the main cavity through an outlet port. The female coupler also includes a movable piston which assists in moving the main valve against excessive pressure which may be contained within the male coupler and a collar member which limits the travel of the main valve. The female coupler further includes a flow check prevention valve positioned within the main cavity which assures that the pressure impinging on the piston will be equal to or greater than the pressure present in the remainder of the main cavity. The flow check prevention valve functions to insure that the passageway between the male and female couplers remain open when fluid flow out of the female coupler is blocked by a directional control valve and when a vacuum occurs within the main cavity due to displacement of fluid within the hydraulic function. The female coupler also includes a lever mechanism to assist in the coupling and uncoupling process.

22 Claims, 7 Drawing Figures

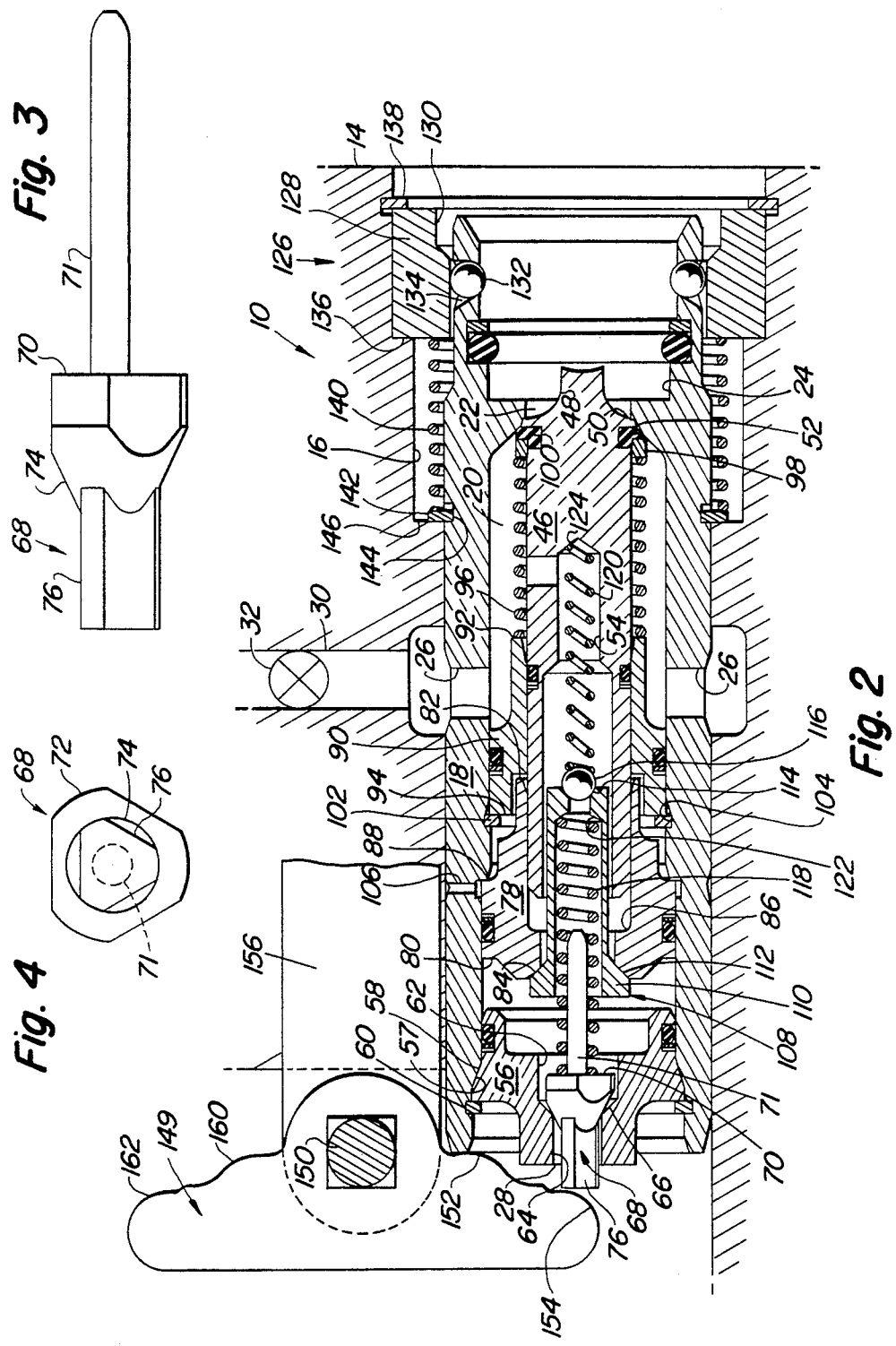

FLOW CHECK PREVENTION MECHANISM

CROSS REFERENCE TO RELATED APPLICATION

This is a continuation-in-part of U.S. application Ser. No. 491,519, filed May 4, 1983, abandoned, and U.S. application Ser. No. 696,542, filed Jan. 30, 1985, abandoned, which is a continuation of U.S. application Ser. No. 438,120, filed Nov. 1, 1982, abandoned.

FIELD OF THE INVENTION

This invention relates to a flow check prevention mechanism and more particularly to a female coupler with a flow check prevention mechanism for preventing closure of a male coupler which is inserted into the female coupler should a vacuum occur in the female coupler and fluid flow through the male coupler and out of the female coupler is momentarily blocked.

BACKGROUND OF THE INVENTION

Numerous female couplers are currently available for coupling to and uncoupling from a pressurized or non-pressurized male coupler. Such couplers are used extensively in hydraulic hook-ups such as are used in agricultural and industrial vehicles. U.S. Pat. No. 4,303,098, entitled "Female Coupler" which issued on Dec. 1, 1981 to the assignee, describes such a coupler. In using a pair of the above-identified couplers, wherein one coupler serves to direct fluid from a pressurized supply source to one end of a hydraulic cylinder and the second coupler receives flow from the opposite end of the hydraulic cylinder and routes it to a sump, a problem occurs when fluid flow through the female couplers is intentionally blocked by closing a directional control valve associated with the second female coupler. Under these conditions, fluid flow into and out of the hydraulic cylinder is non-existent although the piston within the cylinder can fluctuate to a small extent. This fluctuation of the piston within the cylinder is caused by the implement, to which the cylinder is attached, being worked over uneven ground. As the piston fluctuates, the fluid on one side of the piston is compressed while the fluid on the opposite side of the piston experiences a pressure drop or vacuum. The pressure drop or vacuum is conveyed to the respective female coupler and results in a situation in which the fluid contained in the female coupler flows outward towards the hydraulic cylinder. This creates a vacuum within the main cavity. As this occurs, the main valve positioned in the female coupler may move and allow the male check ball to close upon a sudden surge of return oil from the hydraulic function. Once the male check ball is closed, a block is formed in the system which presents problems once the directional control valve(s) are again reopened. For example, as the directional control valves are reopened, pressurized fluid is allowed to pass through the first female coupler to the head end of the hydraulic cylinder. However, the piston within the cylinder will be unable to move because the fluid on the rod end of the piston will be blocked from flowing through the second female coupler due to the closed male check ball. Up until now, the only way the operator could correct this problem was to first reverse the flow thereby opening the male check ball associated with the rod end of the hydraulic cylinder and then again reversing the flow such that the flow would be directed to the head end of the hydraulic cylinder.

Now, a female coupler has been invented which overcomes this problem by using a flow check prevention mechanism to prevent the male check valve from closing should a vacuum occur in the second female coupler.

SUMMARY OF THE INVENTION

Briefly, this invention relates to a flow check prevention mechanism which is especially useful in a female coupler. The flow check prevention mechanism prevents closure of a male coupler which is coupled to the female coupler should a vacuum occur in the female coupler followed by a pressure surge in the male coupler. The female coupler includes a housing having a bore formed therein. Positioned within the bore is a receptacle having a main cavity joined by a passageway to an engagement bore which is located at one end thereof. The male coupler is engageable into the engagement bore. The receptacle also has a valve seat formed about the periphery of the passageway and first and second ports which communicate with the main cavity. Positioned within the main cavity is a main poppet valve which controls the fluid flow through the passageway. The main poppet valve has an internal passage formed therein which provides fluid communication between the first and second ports and has a valve stem which extends outward from one end and projects through the passageway into the engagement bore when the main poppet valve is in a closed position. A second poppet valve is also present which is located in the second port for controlling fluid flow therethrough.

The receptacle and the secondary poppet valve are linearly moveable by a lever-actuated cam which is pivotally attached to the housing. The cam contains a pair of lobes, one of which contacts an end of the receptacle and the second of which contacts an end of the secondary poppet valve. As the first lobe contacts and moves the receptacle, engagement balls located about the periphery of the engagement bore are axially moved thereby allowing coupling or uncoupling of a male coupler. As the second lobe contacts the secondary poppet, fluid present within the main cavity is allowed to be drained to sump.

The female coupler also includes a piston which is movably positioned in the main cavity between the first and second ports and a collar member which limits the overall travel of the main poppet valve. The piston has a first end against which fluid can impinge and a second end which contacts a portion of the main poppet valve. The piston is actuated by fluid pressure so as to assist in moving the main poppet valve against excessive pressure contained in the male coupler thereby causing the male check member to open.

Lastly, the female coupler includes a flow check prevention mechanism positioned within the main cavity between the first and second ports. The flow check prevention mechanism permits fluid flow in one direction to the first end of the piston at a first predetermined pressure value and permits fluid flow in the opposite direction to relieve fluid pressure from the first end of the piston at a higher predetermined pressure. By normally maintaining a slightly less, equal or greater pressure on the first end of the piston, relative to the pressure in the remainder of the main cavity, the male check member will be prevented from closing should a vacuum exist in the main cavity of the female coupler followed by a pressure surge in the male coupler.

In one embodiment, the flow check prevention mechanism comprises a hollow poppet having a first valve seat formed adjacent to one end which is mateable with the piston. A second valve seat is also formed at an opposite end of the hollow poppet and serves as a seat for a mateable check ball. The check ball prevents the flow through the hollow poppet to the first end of the piston while permitting flow in the reverse direction when the fluid at the first end of the piston increases in pressure due to thermal expansion. First and second springs are also positioned on opposite sides of the flow check prevention valve with the first spring acting to bias the first valve seat against the piston while the second spring acts to bias the check ball against the second valve seat.

In a preferred embodiment, the flow check mechanism comprises a resilient ball positioned in the internal passageway of the main poppet between two recesses formed about the inner periphery of the internal passageway. In this embodiment, the internal passageways comprise a cylindrical bore. The resilient ball has an outside diameter slightly larger than the inside diameter of the bore and less than the diameter of the recess. The ball is retained in position by first and second springs which are positioned in the bore between the first port and the ball and between the ball and the second port, respectively. The springs assist in urging the ball back to a set position once the ball has been displaced by pressurized fluid. The ball is moveable rightward into alignment with a first recess to relieve pressure acting on its left surface when this left side pressure, plus the force of the second spring, is greater than the fluid pressure acting on the right side of the ball plus the force from the first spring. In a similar fashion, the ball is movable leftward into alignment with a second recess to relieve pressure acting on its right surface.

The general object of this invention is to provide a female coupler with a flow check mechanism which can be used to prevent closure of an engaged male coupler should a vacuum occur in the female coupler or should a high return flow force occur on the male check valve.

Another object of this invention is to provide a relatively simple and economical flow check mechanism for use in a female coupler.

Another object of this invention is to provide a flow check mechanism which checks flow in one direction at a low pressure and relieves fluid in an opposite direction at a higher pressure.

Still further, an object of this invention is to provide a female coupler with a flow check prevention mechanism which includes a flow check ball which permits the relief of fluid from the left end of the main cavity when the fluid increases in pressure due to thermal expansion.

Other objects and advantages of the present invention will become more apparent to those skilled in the art in view of the following description and the accompanying drawings.

BRIEF DESCRIPTION OF THE DRAWINGS

FIG. 2 is a sectional view of the female coupler shown in FIG. 1 having the main valve in a closed position and showing an alternative lever arrangement.

FIG. 3 is an enlarged side view of the secondary valve.

FIG. 4 is an enlarged left end view of the secondary valve shown in FIG. 3.

DETAILED DESCRIPTION

Figure 1:
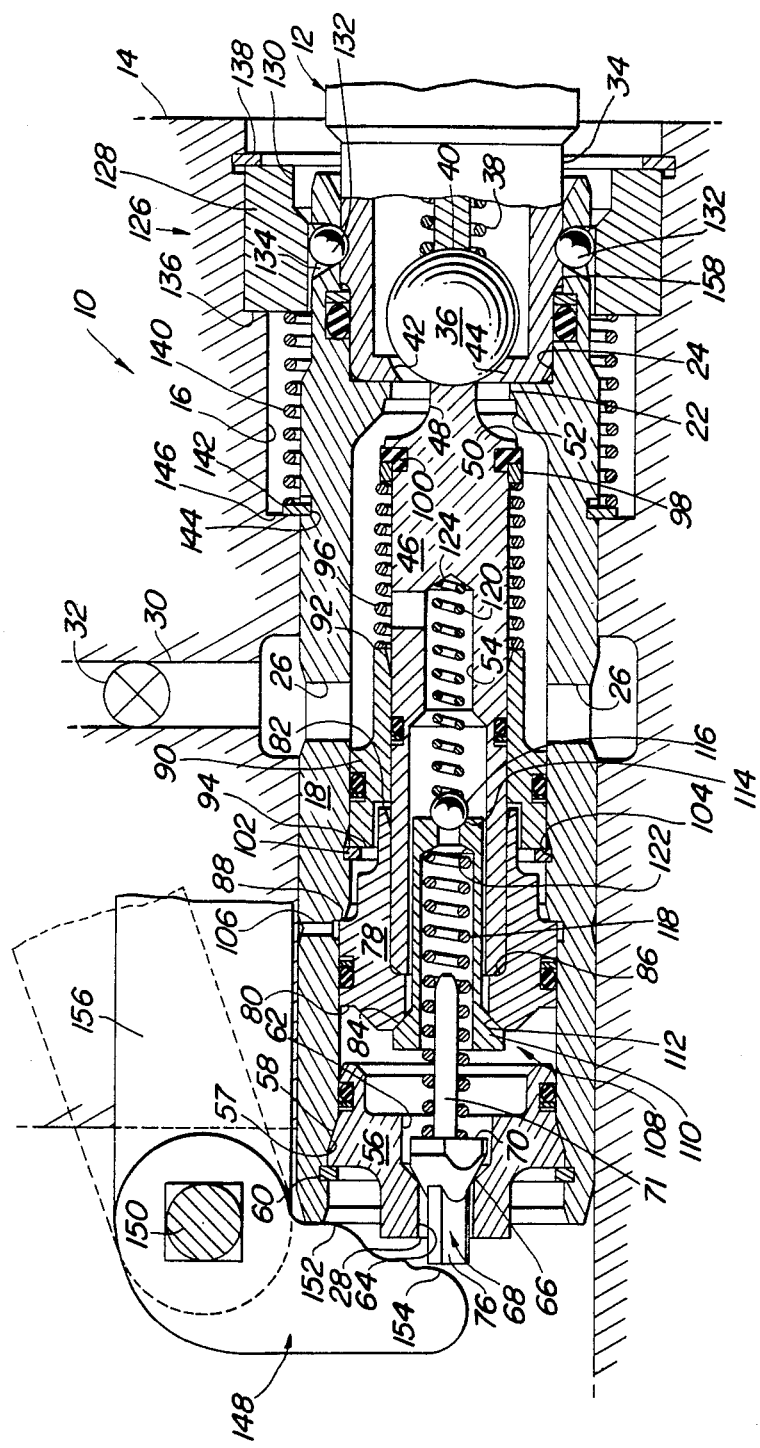
FIG. 1 is a sectional view of a female coupler with a flow check mechanism showing a male coupler coupled thereto and having its main valve in an open position.

Referring to FIG. 1, a female coupler 10 is shown which is coupled to a male coupler 12. Such couplers 10 and 12 are common features on agricultural tractors wherein they are normally arranged in pairs to provide hydraulic connections between a fluid reservoir and a source of fluid pressure and the ends of a working cylinder. For purposes of convenience, and not by way of limitation, the viewers right will be taken as the right-hand side of the female coupler 10.

The female coupler 10 includes a housing 14 having a bore 16 formed therein. Preferably, the bore 16 is open at each end. Movably positioned within the bore 16 is a receptacle 18 which contains a main cavity 20 and a passageway 22 which opens into an engagement bore 24. Preferably, the main cavity 20 is centrally located within the receptacle 18 while the engagement bore 24 is located at the right end thereof. Fluid can be directed into and out of the main cavity 20 through a first port 26 and a second port 28. The first port 26 communicates with a conduit 30 which has a directional control valve 32 positioned thereacross. The directional control valve 32 regulates the flow of pressurized fluid into, and sometimes out of, the main cavity 20. As indicated in FIGS. 1 and 2, the first port 26 can be either a single port or a plurality of ports formed in the periphery of the receptacle 18. While the first port 26 will permit fluid flow in either direction, the second port 28 is primarily an outlet port which permits fluid flow out of the main cavity 20 to a reservoir (not shown). The fluid which enters the reservoir can then be recycled and used within the hydraulic circuit.

Referring now to the male coupler 12, which is insertable into the engagement bore 24, one will notice that it includes a male check member 34. The male check member 34 consists of a check ball 36, a compression spring 38, a stop 40 and a valve seat 42, with the ball being located between the seat 42 and the stop 40 and normally being biased to a closed position against the seat 42 by the spring 38. The male check member 34 is attached to the end of a hydraulic hose which in turn is connected to a hydraulic function, such as one end of a hydraulic cylinder having a movable piston therein. Movement of the piston within the cylinder causes fluid flow through the hydraulic hose. It should be noted that the stop 40 serves to limit the rightward movement of the check ball 36.

Positioned within the main cavity 20 is a movable main valve 46 which is preferably a poppet valve. Formed on the right-hand end of the main valve 46 is a stem 48 which projects through the passageway 22 and into the engagement bore 24 when the main valve 46 is in a closed position as shown in FIG. 2. Positioned just to the left of the stem 48 and formed in the periphery of the main valve 46 is a beveled surface 50 which mates with an interior valve seat 52 formed adjacent to the left peripheral surface of the passageway 22. When the beveled surface 50 is seated against the interior valve seat 52, the passageway 22 is blocked. In the blocked position, the main valve 46 is in its right-most position as indicated in FIG. 2. The main valve 46 also includes an internal passage 54 which provides fluid communication between the first port 26 and the second port 28.

To the left of the main valve 46 is the second port 28 which is preferably circular in cross section and which is axially aligned with the elongated central axis of the receptacle 18. This second or outlet port 28 is constructed in an end member 56 which has an annular tapered outer surface 57 which is shown being held against a similarly tapered inner surface 58 of the receptacle 18 by a snap ring 60. Other methods of fastening the end member 56 to the receptacle 18 can also be used. The second port 28 is formed having two different internal diameters 62 and 64 which are interconnected by an inclined or slanted surface 66. The smaller of the two internal diameters 64 is located in the left or outer portion of the end member 56.

A secondary valve 68 is positioned in the second port 28 and is movable between an open and a closed position. The secondary valve 68, which is preferably a poppet valve, is best seen in FIGS. 3 and 4 and is of a complex configuration. As shown, the right-hand end of the secondary valve 68 is in the form of a head including a flat right-hand surface 70 from which an elongated pin 71 extends rightwardly. A right half portion of the head of the secondary valve 68 is preferably triangular in cross section and has rounded corners 72, see FIG. 4. Blending with and extending leftwardly from the corners 72 is a circular tapered section 74 which narrows into an elongated triangular stem 76. The tapered section 74 forms a mating surface with the slanted surface 66 formed on the end member 56. It should be noted that although the elongated stem 76 and the flat right-hand surface 70 have a triangular cross-sectional configuration, other configurations are also feasible.

Positioned within the main cavity 20 between the first and second ports, 26 and 28 respectively, is a movable piston 78. The piston 78 has a sleeve-type configuration which is in slidable contact with the outer periphery of the main valve 46 and with the inside surface of the receptacle 18. The piston 78 has a left-hand end surface 80, a right-hand end surface 82, and a shoulder 86. As fluid flows through the inner passage 54 of the main valve 46, it is brought in contact with and impinges on the left-hand surface 80 of the piston 78 thereby causing the piston 78 to move rightward. The extent of rightward movement of the piston 78 is limited by a step 88 formed on the inner periphery of the receptacle 18 while leftward movement of the piston 78 is limited by contact with the end member 56.

A collar member 90 is also positioned within the main cavity 20 and encircles a portion of the main valve 46. The collar member 90 has a right-hand end surface 92 and a left-hand end surface 94. The right-hand end surface 92 is in constant contact with a compression spring 96 which encircles a portion of the main valve 46. The compression spring 96 abuts a retainer ring 98 which is positioned adjacent to an annular seal 100. The retainer ring 98 and the seal 100 are preferably positioned adjacent to the base of the stem 48. The left-hand end surface 94 of the collar member 90 abuts a retainer ring 102 which is positioned in a groove 104 formed on the inner circumference of the receptacle 18. The combination of the compression spring 96 and the retainer ring 102 serves to limit the travel of the collar member 90. In addition, the compression spring 96 urges the main valve 46 to the right so that the beveled surface 50 seats against the interior valve seat 52 as shown in FIG. 2. The compression spring 96 should be constructed with a sufficient spring force to hold the main valve 46 in a closed position thereby blocking fluid flow through the passageway 22 when the male coupler 12 is not inserted into the engagement bore 24.

As shown in FIGS. 1 and 2, a vent 106 is provided in the receptacle 18 to the left of the collar member 90. This vent 106 provides an escape for any fluid that may become trapped between the piston 78 and the collar 90. Preferably, the fluid which escapes through the vent 106 will be directed back to a reservoir (not shown) such that it can be re-used again.

The female coupler 10 also includes a flow check prevention mechanism which is positioned within the main cavity 20 between the first and second ports, 26 and 28 respectively. In one embodiment, the flow check prevention mechanism comprises a valve 108 including a hollow poppet valve 110 having a first valve seat 112 formed adjacent to one end which is mateable with a beveled surface 84 formed on the piston 78. The flow check prevention valve 108 also has a second valve seat 114 formed at an opposite end thereof. A check ball 116 is mateable with the second valve seat 114 so as to relieve fluid from the left end of the main cavity 20 through the interior section of the hollow poppet valve 110. This relief action occurs only when the fluid in the left end of the main cavity 20 increases in pressure above a predetermined value due to thermal expansion. The flow check prevention valve 108 is biased within the main cavity 20 by first and second springs 118 and 120, respectively. The first spring 118, which exerts a greater force on the flow check prevention valve than the spring 120, is sandwiched between the flat right-hand surface 70 of the secondary valve 68 and an inner shoulder 122 of the hollow poppet valve 110. The first spring 118 is prevented from lateral deflection a substantial amount by both the elongated pin 71, which extends out of the secondary valve 68, and by the inner circumference of the hollow poppet valve 110. The second spring 120 is positioned within the internal passage 54 of the main valve 46 and is sandwiched between an end surface 124 of the passage 54 and the check ball 116. The flow check prevention valve 108 is normally biased to a closed position wherein the first valve seat 112 mates with the beveled surface 84 and the check ball 116 is resting on the second valve seat 114 thereby blocking fluid flow therethrough.

The flow check prevention valve 108 functions to assure that the pressure impinging on the left-hand end surface 80 of the piston 78 will always be just slightly less than, equal to or greater than the fluid pressure within the remainder of the main cavity 20 when the secondary valve 68 is closed. This is accomplished by allowing fluid to flow through the passage 54 into the left end of the main cavity 20 and then trapping this fluid so as to limit the leftward movement of the main poppet valve 46 after the passage 22 is opened. Because the fluid flowing across the flow check prevention valve to the left end of piston 78 must compress the spring 118, the fluid pressure acting on piston 78 will be slightly less than the fluid pressure in the right-hand end of the main cavity. Should the fluid in the left end of the main cavity 20 substantially increase in pressure due to thermal expansion, the check ball 116 will be lifted off its seat 114 and allow some of the pressurized fluid to escape. It should be noted that the fluid pressure needed to open the check ball 116 is much higher than the fluid pressure needed to move the flow check prevention valve to the left because of the different surface area on which the fluid works. This assures that the check ball 116 will relieve pressurized fluid that increased in pressure due to thermal expansion.

The ability of the check ball 116 to relieve pressurized fluid from the left end of the main cavity 20 should thermal expansion or transient pressure spikes rise above a desirable pressure limit insures that the camming action of the lever 156 will open the secondary poppet valve 68. If the pressure in the left end of the main cavity 20 would increase due to thermal expansion and should no means be provided for relieving the increased pressure, then the secondary poppet valve 68 would not open and the male coupler 12 would be ejected under pressure from the engagement bore 24.

By having the flow check prevention valve 108 in the female coupler 10 and constructing it such that it permits leftward flow of fluid at a lower pressure valve than the value at which it permits the rightward flow of fluid, it assures that the male check ball 36 will not be closed by any pressure surges at any time while it is coupled to the female coupler. This is important for it means that should the directional control valve 32 be closed while the passage 22 is open and at a time when a vacuum occurs in the main cavity 20 of the female coupler 10, the check ball 36 will not close against its seat 42. The passage 22 between the female and male couplers, 10 and 12 respectively, will remain open because the male check ball 36 will not be able to force the main valve 46 to the left because of the pressure impinging on the left-hand surface 80 of the piston 78. By using the flow check prevention valve 108 in each of the pair of female couplers 10, one can be assured that once the directional control valves 32 for each female coupler 10 is moved to an open position, regardless of the direction of flow, fluid will be able to be directed into or out of the hydraulic function.

Positioned circumferentially about the right-hand end of the receptacle 18 is an attachment device 126. This attachment device 126 serves to hold the male coupler 12 in the engagement bore 24. The attachment device 126 includes a sleeve 128 having an internal race 130. The sides of the race 130 are preferably slanted to facilitate the acceptance of engagement balls 132 which are positioned in sockets 134 located in the rightmost extremity of the receptacle 18. The sleeve 128 is held secure within the housing 14 by a shoulder 136 and by a snap ring 138.

A compression spring 140 is sandwiched between the sleeve 128 and a retainer ring 142. The retainer ring 142 is retained in a groove 144 which is machined into the outer surface of the receptacle 18. The retainer ring 142 normally abuts a shoulder 146 formed in the housing 14 due to the force of the compression spring 140.

In order to move the receptacle 18 to the right against the force of the compression spring 140, a lever-actuatable cam 148 is employed. This lever-actuatable cam 148 is pivotally secured to the housing 14 by a pin 150 and includes first and second cam lobes 152 and 154 and a lever arm 156. For the sake of simplicity, the lever arm 156 will be described as initially being positioned in the horizontal plane wherein it is capable of being raised. By raising the lever arm 156 to the position indicated by the dotted line in FIG. 1, the first cam lobe 152 will be brought into contact with the left end of the receptacle 18. As the first cam lobe 152 urges the receptacle 118 to the right, the engagement balls 132 will roll partially out of the sockets 134 and into the race 130. With the engagement balls 132 positioned in the race 130, an unobstructed path is provided so that the male coupler 12 can be inserted into the engagement bore 24. In this position, the compression spring 140 is compressed and exerts a leftward force on the receptacle 18 via the retainer ring 142. The receptacle 18 will therefore return to its initial position once the lever arm 156 is lowered.

As the lever arm 156 is raised further, the second cam lobe 154 will contact the stem portion 76 of the secondary valve 68 and cause it to move rightward to an open position. Preferably the secondary valve 68 will open prior to the time that the engagement balls 132 move into the race 130. With the second port 28 opened, any fluid which may be present to the left of the check ball 116 can seep out. This assures that only a small quantity of non-pressurized fluid will remain to the left of the check ball 116 and therefore the main valve 46 will be free to move leftward as the male coupler 12 is inserted into the engagement bore 24. It should be noted that the operator is able to insert the male coupler 12 with one hand while holding the lever arm 156 upwards with the second hand. As the operator lowers the lever arm 156, the cam lobes 152 and 154 will move leftward away from the receptacle 18 and the secondary valve stem 76, respectively. The receptacle 18 will move leftward simultaneously due to the force of the compression spring 140. As the receptacle 18 moves leftward, the secondary valve 68 will close due to the force of the spring 118 and the engagement balls 132 will roll out of the race 130 and return to the sockets 134. The engagement balls 132 will contact a lip 158 formed on the outer circumference of the male check member 34 and will sufficiently hold the male coupler 12 in the engagement bore 24.

An alternative embodiment of a lever-actuatable cam 149 is depicted in FIG. 2 wherein four cam lobes designated 152, 154, 160 and 162 are present. This embodiment allows two female couplers 10 (only one of which is shown) to be actuated with only one offset lever arm 156. With this arrangement, movement of the lever arm 156 above the horizontal position will activate the lower female coupler (shown) while movement of the lever arm 156 below the horizontal position will activate an upper female coupler (not shown). Other arrangements and setups will be apparent to those skilled in the art. The primary purpose of the lever-actuatable cams 148 or 149, which incidentally can be manually or automatically operated, is to facilitate the coupling and uncoupling of the female coupler 10 to and from the male coupler 12. The lever-actuatable cams 148 or 149 becomes especially important when the male coupler 12 is in a pressurized condition.

Numerous seals, such as O-rings and Teflon rings, are utilized within the female coupler 10 to prevent leakage between the various elements. These seals have not been discussed in detail since their function is well-known to those skilled in the art.

Figure 5:
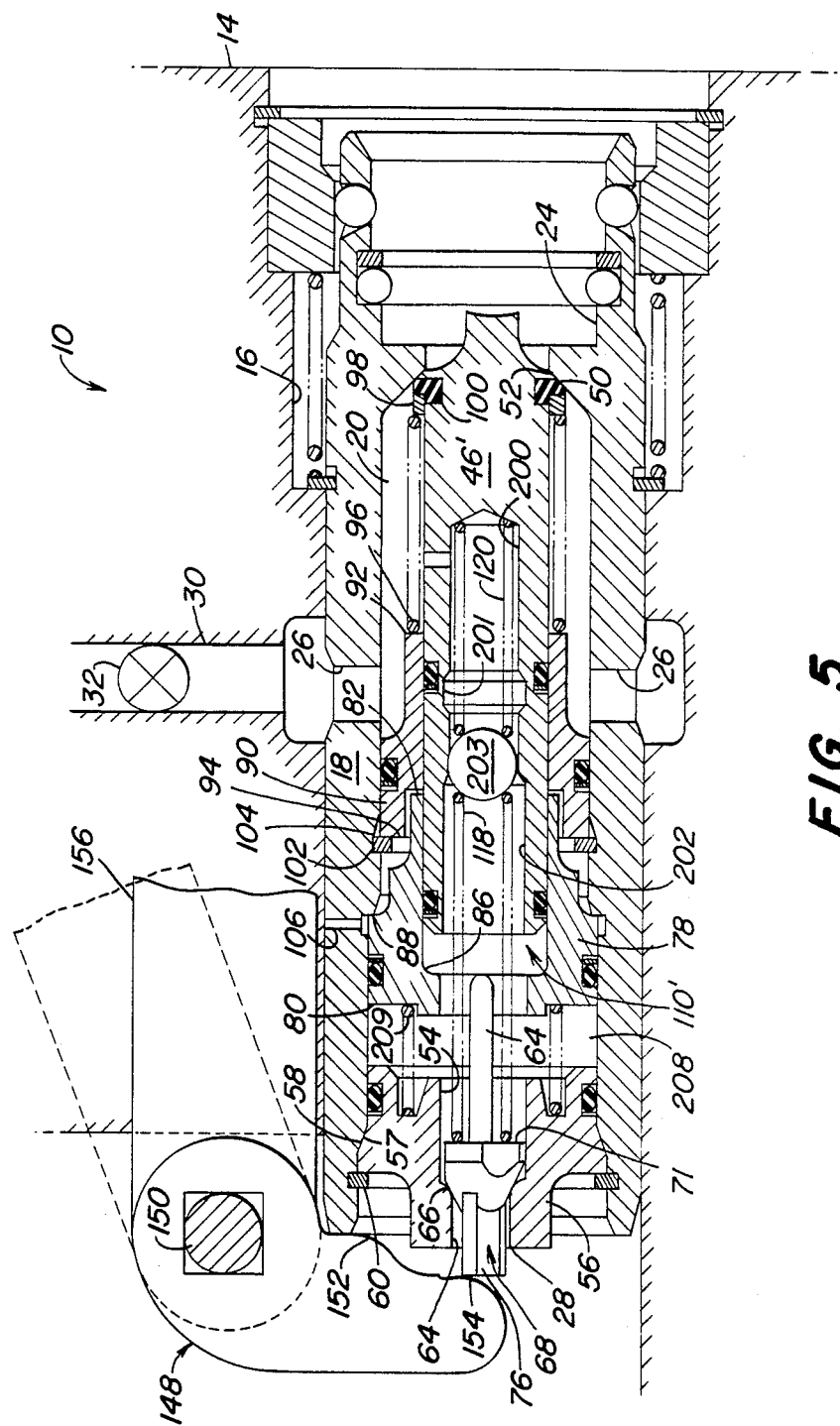
FIG. 5 is a cross-sectional view of a female coupler having a preferred flow check mechanism.

Referring to FIG. 5, a female coupler 10 is shown having a preferred flow check prevention mechanism 108. With the exception of the modifications to flow check prevention mechanism and the addition of spring 209, which acts between end member 56 and piston 78 to urge the piston rightward, the couplet of FIG. 5 is the same as the coupler of FIG. 1.

Looking at receptacle 18 there is again positioned within the main cavity 20 moveable main valve 46', which is a poppet valve and a flow check mechanism 110'. In this embodiment, the main valve 46' has an internal passage 200 which provides fluid communication between the first port 26 and second port 28. A pair of recesses 201 and 202 are formed on the inner periphery of the internal passage 200. Recesses 201 and 202 are spaced apart by a distance of at least one half the diameter of passage 200. The flow check mechanism 110' includes a resilient ball 203 positioned between the first and second recesses 201 and 202, respectively. The resilient ball 203, which is constructed of a synthetic material, for example neoprene, has an outside diameter slightly larger than the inside diameter of the internal passage 200 and less than the diameter of either of the recesses 201 or 202. When positioned in the passage 200, the ball is slightly compressed and has an interference fit therewith. The resilient ball 203 is retained between the recesses 202 and 201 by first and second springs 118 and 120, respectively. Second spring 120 is positioned in the internal passage 200 to the right of the resilient ball 203 and has a higher spring rate than the first spring 118. The first spring 118 is positioned in the internal passage 200 to the left of the resilient ball 203. The first spring 118 is very flexible in nature and therefore is guided by elongated pin 64 and the inner periphery of the internal passage 200. The first spring 118 has a very low spring rate, preferably in the range of 1 to 6 pounds per inch. The spring sizes and rates are typically selected such that a force is exerted on the ball to urge the ball to a set position closer to the second recess than the first recess.

OPERATION

The procedure of coupling both a pressurized and a non-pressurized male coupler to the female coupler 10 will now be explained. This explanation will be given assuming that a pair of female couplers 10 are or will be connected by hydraulic hoses to opposite ends of a hydraulic cylinder having a movable piston therein. The coupling process will be directed to the female coupler which is or is to be attached to the rod end of the hydraulic cylinder. The fluid will be flowing from the rod end of the hydraulic cylinder, through the female coupler 10 and into a reservoir.

COUPLING IN A NON-PRESSURIZED SITUATION

To couple a non-pressurized male coupler 12 to the female coupler 10, the procedure is as follows. Starting with the main valve 46 in a closed position, as depicted in FIG. 2, and with the directional control valve 32 closed, so that no fluid can flow out of the main cavity 20, the operator raises the lever arm 156. This action causes the cam lobe 152 to contact the left end of the receptacle 18 and start to push it to the right. As the lever arm 156 is raised further, the second cam lobe 154 will contact the stem 76 of the secondary valve 68 and move it rightward to an open position. This action allows any fluid trapped in the main cavity 20 to exit to a sump. Further raising of the lever arm 156 causes alignment of the race 130 with the sockets 134 thereby permitting the engagement balls 132 to roll partially into the race 130 so that the male coupler 12 will have an unobstructed path into the engagement bore 24. At the same time, the spring 140 is compressed by the rightward movement of the receptacle 18 and it will exert a force on the receptacle 18 to move it leftward as the lever arm 156 is lowered.

The operator then inserts the male coupler 12 into the engagement bore 24 with one hand as he holds the lever arm 156 in the raised position with the other hand. Once the male coupler 12 is inserted, the operator holds it in place as he lowers the lever arm 156 to its original position. This lowering of the lever arm 156 causes the cam lobes 152 and 154 to move away from the receptacle 18 and the secondary valve 68, respectively. Simultaneously, the spring 140 urges the receptacle 18 leftwards. As the receptacle 18 moves leftward, the engagement balls 132 will roll back into the sockets 134 and forceably contact the outer circumference of the male check member 34, just to the right of the lip 158. This forceable contact is sufficient to hold the male coupler in the engagement bore 24.

As the male coupler 12 is inserted into the engagement bore 24, the stem 48 of the main valve 46, which is being urged to the right by the spring 96, will contact the male check ball 36 and push it rightward off its seat 42. The male check ball 36 will move rightward compressing the spring 38 until it contacts the stop 40. It should be noted that the force of the spring 96 acting on the main valve 46 of the female coupler 10 is much stronger than the force of the spring 38 acting on the male check ball 36.

With the check ball 36 abutting the stop 40, further insertion of the male coupler 12 into the engagement bore 24 will cause the main valve 46 to move leftward compressing the springs 96 and 118. This leftward movement of the main valve 46 causes the bevel surface 50 to move away from the interior valve seat 52 thereby opening the passageway 22. Fluid flow through the passage 22 will now be possible as soon as the directional control valve 32 is open.

With the directional control valve 32 open, fluid will flow both from the male coupler 12 through the first port 26 to a reservoir and also through the passge 54 to the left end of the main cavity 20. The fluid flowing into the left end of the main cavity 20 will be prevented from exiting through the outlet port 28 because the secondary valve 68 will be closed due to the force of the springs 118 and 120. This means that the fluid pressure in the left end of the main cavity will build to a desirable value wherein it will urge the piston 78 rightward until it contacts the step 88. The flow check prevention valve 108 will already be biased rightwards by the force of the spring 118 acting on the inner shoulder 122. Once the flow check prevention valve 108 is seated at 112 against the bevel surface 84, no further flow will be allowed into the left end of the main cavity 20. From this point on, all fluid will flow from the male coupler 12 through the female coupler 10 to a reservoir. The coupling process is therefore completed.

UNCOUPLING IN A NON-PRESSURIZED SITUATION

To uncouple a non-pressurized connection, the operator closes the directional control valve 32 and raises the lever arm 156. The raising of the lever arm 156 partially moves the receptacle 18 rightward along with opening the secondary valve 68 thereby relieving fluid from the main cavity 20. Further raising of the lever arm 156 will move the receptacle 18 further rightwards and allow the engagement balls 132 to roll into the race 130 thereby releasing the force which was holding the male coupler 12 in the engagement bore 24. As the operator pulls the male coupler rightward with one hand, the main valve 46 of the female coupler 10 will be urged to a closed position by the force of the springs 96 and 118. The operator then lowers the lever arm 156 thereby closing the outlet port 28 and the uncoupling process is completed.

COUPLING IN A PRESSURIZED SITUATION

To couple the female coupler 10 to a pressurized male coupler 12, the process differs in that the increased fluid pressure in the male coupler 12 will prevent the male check ball 36 from initially moving away from the seat 42.

The procedure is as follows. The operator first closes the directional control valve 32 and raises the lever arm 156 thereby partially moving the receptacle 18 to the right while simultaneously opening the secondary valve 68. With the outlet port 28 open, fluid is bled out of the main cavity 20. Further raising of the handle 156 permits the male coupler 12 to be inserted into the engagement bore 24 without being obstructed by the engagement balls 132. As the male check ball 36 contacts the main valve 46, it pushes the main valve 46 leftwards while remaining against the seat 42. This means that the male coupler 12 will be fully inserted into the engagement bore 24 while the male check ball 36 is still seated against the seat 42. At the same time, the main valve 46 is moved leftward wherein it abuts the shoulder 86 of the piston 78 and drives it leftward. In order to open the male check ball 36, pressure within the receptacle 18 has to be increased. This is accomplished by having the operator lower the lever arm 156 and then open the directional control valve 32. The incoming fluid is then permitted to flow through the passage 54 and around the first valve seat 112 of the flow check prevention valve 108 to the left end of the main cavity 20. As this fluid pressure increases, it acts on the total surface 80 of the piston 78. When the force of the fluid impinging on the surface 80, along with the force of the compression springs 96, 118 and 120, exceeds the combined resistant forces of both the fluid impinging on the right side of the male check ball 36, the force of the spring 38 and the force of the fluid impinging on the right end of the main valve 46, the main valve 46 will start to move rightward thereby moving the male check ball 36 off its seat 42. This movement causes the passage 22 to be opened thereby permitting flow from the female coupler 10 to the male coupler 12.

It should be noted that the pressure required in the female coupler 10 to create the above action is considerably less than the internal pressure present in the male coupler 12.

UNCOUPLING IN A PRESSURIZED SITUATION

The uncoupling of a pressurized male coupler is the same as that described above for the non-pressurized uncoupling process except that the pressure in the male coupler and the spring 38 will act to move the main valve 46 leftward and close the male check ball as soon as the secondary poppet 68 is opened.

PREVENTING CLOSURE OF THE MALE CHECK BALL

The operation of the flow check prevention mechanism 108 will now be described starting from a position wherein the rod end of the hydraulic cylinder is connected to this particular female coupler 10 and the directional control valve 32 is closed. Such a situation normally occurs when the fluid directed to the hydraulic function is cut off and the piston within the hydraulic cylinder is at rest. In such situations, the movement of the implement, to which the hydraulic cylinder is connected, will cause the piston within the cylinder to move a very small amount. Such movement creates a vacuum on the rod end of the cylinder which causes a vacuum in the female coupler 10. Once the directional control valve 32, which is associated with the head end of the hydraulic cylinder, is opened, a pressure surge is created in the rod end which is conveyed to the male coupler 12 such that the male check ball 36 tries to seat against its seat 42. This however, is not possible with the present invention because the flow check prevention valve 108 will maintain fluid at a predetermined pressure at the left end of the main cavity 20. The only fluid that can escape is the increase due to thermal expansion. With a slightly less, equal or greater pressure always being present in the left end of the main cavity 20 when the secondary valve 68 is closed, the main valve 46 will be essentially restrained from moving leftward from the position depicted in FIG. 1. This means that the male check ball 36 will be unable to seat against its seat 32 and therefore the passage 22 will never be blocked once the male coupler 12 is coupled to the female coupler 10.

The preferred flow check mechanism 110' as shown in FIG. 5 operates in a manner analogous to that previously described. FIG. 5 shows the resilient ball 203 when the female coupler 10 is in an uncoupled position. In this position, the resilient ball 203 is positioned adjacent to the second recess 202 and is compressed slightly so as to form a tight seal with the inner periphery of the internal passage 200.

As a male coupler is inserted into engagement bore 24 and the main valve 46 moves leftward, the resilient ball 202 will move leftward under the influence of fluid pressure into alignment with the second recess 202 such that the fluid can flow around the resilient ball 203 and through the internal passage 200 from the main cavity 20 to the piston cavity 208. Resilient ball 203 will remain in alignment with the second recess 202 during initial pressurization of piston 78 to provide a flow path around the resilient ball 203 into the piston cavity 208. Once the force of the fluid entering cavity 208 equals the force of the fluid on the left side of the resilient ball 203, the force of the first spring 118 will reposition the resilient ball 203 such that it contacts the inner periphery of the first passage 200. This action will seal off fluid flow through the inner passage 200.

Figure 7:
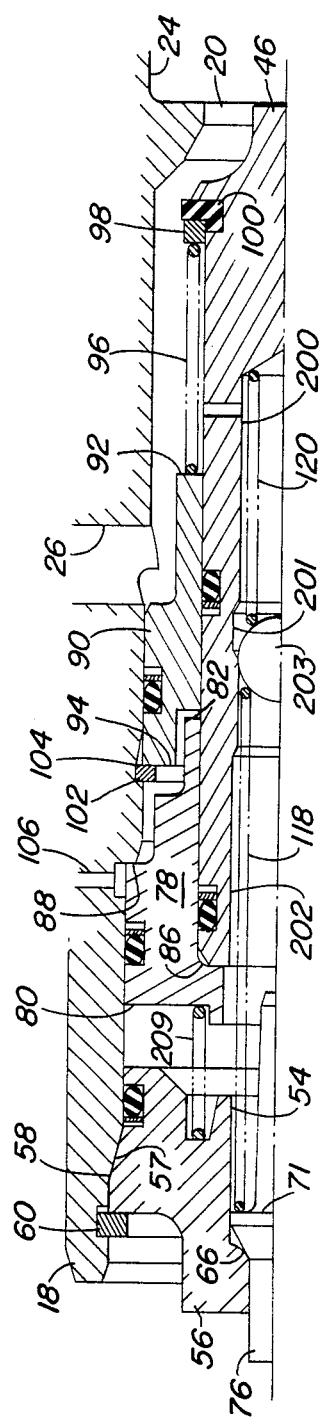
FIG. 7 is a partial sectional view of the flow check mechanism of FIG. 5 when there is fluid pressure in the piston cavity.

If a pressure drop as previously described is experienced in the main cavity 20, the pressure of the fluid in the piston cavity 208 plus the force of the first spring 118 may be sufficient to cause the resilient ball 203 to move rightward. Such rightward movement will compress the second spring 120 as the resilient ball 203 approaches the first recess 201. If the pressure difference between the main cavity 20 and the piston cavity 208 is sufficiently large to overcome the spring force of the second spring 120, the resilient ball 203 will roll into alignment with the first recess 201 and permit the higher pressurized fluid to flow rightward into the main cavity 20. FIG. 7 shows such a situation just before the resilient ball 110 rolls into alignment with the first recess 42. Such a situation occurs due to the thermal expansion of fluid within the piston cavity 208 when the female coupler 10 is either coupled to or uncoupled from a male coupler.

Figure 6:
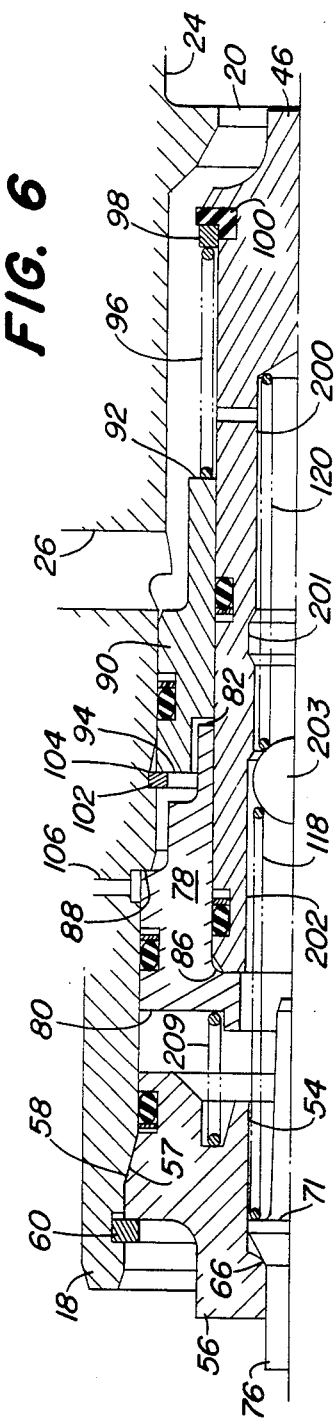
FIG. 6 shows the position of the check valve when fluid flows to the piston.

It should be noted that when the resilient ball 203 is in alignment with the second recess 202, see FIG. 6, the second spring 120 will be fully extended and free from contact with the resilient ball 203. This means that the force needed to move the resilient ball 203 rightwards, back into the sealing arrangements with the inner periphery of the internal passage 200, will be slightly greater than the force of the pressurized fluid impinging on the right side of the resilient ball 110. It should also be noted that due to the difference in the spring rates, a higher force is required to move the resilient ball 203 into alignment with the first recess 201 than is needed to move the ball 203 into alignment with the second recess 202.

While the invention has been described in conjunction with specific embodiments using two alternative lever-actuatable cam arrangements and flow check prevention mechanisms, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

We claim:

1. A female coupler with a flow check prevention mechanism for preventing closure of a male coupler coupled thereto should a vacuum occur in said female coupler when fluid flow out of said female coupler is momentarily blocked, said female coupler comprising:
   (a) a housing;
   (b) a receptacle movably positioned within said housing, said receptacle having a main cavity formed therein which is joined by a passageway to an engagement bore located at one end of said receptacle and into which said male coupler is engageable, a valve seat formed about the periphery of one end of said passageway, and first and second ports which communicate with said main cavity;
   (c) main valve means for controlling fluid flow through said passageway, said main valve means including a valve member having an internal passage formed therein which provides fluid communication between said first and second ports and a valve stem extending outward from said valve member which projects through said passageway and into said engagement bore when said main valve means is in a closed position;
   (d) secondary valve means for controlling fluid flow through said second port, said secondary valve means being movable between an open and a closed position;
   (e) lever-actuatable cam means for linearly moving said receptacle within said housing and for moving said secondary valve means from said closed to said open position;
   (f) piston means for assisting in moving said main valve means against excessive pressure contained in said male coupler, said piston means being positioned within said main cavity between said first and second ports and having a first surface against which fluid can impinge and a second surface which contacts a portion of said main valve means;
   (g) flow check prevention means for regulating fluid flow between said first port and an area adjacent to said first surface of said piston means by permitting fluid flow from the first port to said area at a lower pressure than it permits flow from said area to said first port, said flow check prevention means preventing closure of an opening between said female coupler and said male coupler when a vacuum is present in said main cavity.

2. The female coupler of claim 1 wherein a spring is provided between said main valve means and a stop for urging said main valve toward said valve seat.

3. The female coupler of claim 2 wherein said lever-actuatable cam means is pivotally attached to said housing.

4. The female coupler of claim 1 wherein said flow check prevention means includes a hollow sleeve having a first valve seat formed adjacent to one end thereof which is mateable with said piston and a second valve seat formed at an opposite end thereof, a check ball mateable with said second valve seat and a pair of springs, a first spring acting to bias said first valve seat against said piston and said second spring acting to bias said check ball against said second valve seat.

5. The female coupler of claim 4 wherein said first spring exerts a greater force on the flow check prevention means than said second spring.

6. The female coupler of claim 5 wherein said first spring is positioned between said secondary valve means and said hollow sleeve.

7. The female coupler of claim 6 wherein said flow check prevention means is coaxially positioned within said receptacle.

8. The female coupler of claim 1 wherein said flow check prevention mechanism includes a ball of resilient material positioned in a cylindrical portion of said internal passageway and having an interference fit therewith, first and second recesses formed in the inner periphery of said internal passageway, said recesses being spaced apart along a major axis of said passageway and each being of a size to permit fluid bypass around said ball when said ball is moved into alignment therewith, and first and second springs acting on opposite sides of said ball to bias said ball to a set position between said recesses.

9. The female coupler of claim 8 wherein said first spring is positioned between said secondary valve means and said ball.

10. The female coupler of claim 9 wherein said second spring has a higher spring rate than said first spring.

11. The female coupler of claim 10 wherein each of said recesses is an annular groove formed in the inner periphery of said internal passage.

12. The female coupler of claim 11 wherein a spring acts on said first surface of said piston means for urging said piston means and said main valve means towards said closed position.

13. A female coupler with a flow check prevention mechanism for preventing closure of a male coupler coupled thereto should a vacuum occur in said female coupler when fluid flow out of said female coupler is momentarily blocked, said female coupler comprising:
   (a) a housing having a bore formed therein which is open at both ends;
   (b) a receptacle movably positioned within said bore, said receptacle having a main cavity formed therein which is joined by a passageway to an engagement bore located at one end of said receptacle and into which said male coupler is engageable, a valve seat formed within said main cavity, and first and second ports which communicates with said main cavity;

(c) a main poppet valve positioned within said main cavity for controlling fluid flow through said passageway, said main poppet valve having an internal passage formed therein which provides fluid communication between said first and second ports and having a valve stem extending outward from one end thereof which projects through said passageway into said engagement bore when said main poppet valve is in a closed position;

(d) a secondary poppet valve positioned in said second port for controlling fluid flow therethrough;

(e) a lever-actuatable cam pivotaly attached to said housing which is capable of linearly moving both said receptacle within said bore and said secondary poppet valve from a closed to an open position;

(f) a piston movably positioned within said main cavity between said first and second ports, said piston having a first surface against which fluid can impinge and a second surface which contacts a portion of said main poppet valve whereby said piston assist in moving said main poppet valve against excessive pressure contained in said male coupler;

(g) a flow check prevention valve positioned within said main cavity between said first and second ports, said flow check prevention valve including means for regulating fluid flow between said first port and an area adjacent said first surface of said piston which permits fluid flow from the first port to said area at a lower pressure than it permits fluid from said area to said first port, said valve preventing closure of an opening between said female coupler and said male coupler when a vacuum is present in said main cavity.

14. The female coupler of claim 13 wherein said flow check prevention valve includes a hollow poppet having a first valve seat formed adjacent to one end thereof which is mateable with said piston and a second valve seat formed at an opposite end thereof, a check ball mateable with said second valve seat and a pair of springs, a first of said springs acting to bias said first valve seat against said piston and a second of said springs acting to bias said check ball against said second valve seat.

15. The female coupler of claim 14 wherein said first apring is positioned between said secondary poppet valve and said flow check prevention valve.

16. The female coupler of claim 14 wherein said secondary poppet valve contains an elongated pin which projects towards said flow check prevention valve and serves as a positioner for said first spring.

17. The female coupler of claim 14 wherein said main poppet valve, said flow check prevention valve and said piston are all coaxially aligned within said receptacle.

18. The female coupler of claim 14 wherein said first spring exerts a greater force on said flow check prevention valve than said second spring thereby urging said flow check prevention valve to a closed position blocking fluid flow from said second port to said first port.

19. The female coupler of claim 13 wherein said flow check prevention valve includes an elongated cylindrical bore within said main poppet valve forming a portion of said passageway and having an inlet end in communication with said first port; a ball of resilient material positioned in said bore and having an interference fit therewith; first and second recesses formed in the periphery of said bore, said recesses being spaced apart by a distance of at least one-half the diameter of the bore and each being of a size to form a fluid bypass around the ball when said ball is moved into alignment therewith with said first recess being closer to the inlet end of said bore than said second recess; and said first and second springs are positioned between said secondary poppet valve and said ball and between said ball and said inlet end of said bore respectively.

20. The female coupler of claim 19 wherein said second spring has a higher spring rate than said first spring.

21. The female coupler of claim 19 wherein said springs are sized to exert a force on said ball to urge said ball to a set position closer to said second recess than said first recess.

22. The female coupler of claim 19 wherein each of said recesses is an annular groove formed in the inner periphery of the bore.

* * * * *